United States Patent Office 3,769,354
Patented Oct. 30, 1973

3,769,354
1,2-DIBROMO-1-CYCLOHEXYL-2-NITROETHANE
Clinton Joseph Peake, Medina, N.Y., assignor to FMC Corporation, New York, N.Y.
No Drawing. Filed Apr. 18, 1972, Ser. No. 245,197
Int. Cl. C07c 79/08
U.S. Cl. 260—644               1 Claim

ABSTRACT OF THE DISCLOSURE

A new class of microbicidal compounds consisting of 1,2-dihalo-1-cycloalkyl-2-nitroethanes exhibits microbicidal activity particularly when used in seed treatment and by soil incorporation. The synthesis of members of this class is described in detail and the utility of preferred compounds of the class is exemplified.

---

This invention relates to the general field of microbicides, and particularly to microbicidal compounds for controlling pathogenic organisms by treatment of seeds and by incorporation in soil.

Antifungal activity has been reported for compounds containing a nitroethane moiety,

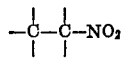

such as 2-bromo-1-methoxy-2-nitro-1-phenylpropane [W. E. Wooldridge, J. Investigative Dermatology, 21, 121 (1953)], 2-nitro-1-phenyl-1-phenylthioethane [N. G. Clark, A. F. Hams and B. E. Leggetter, Nature, 200, 171 (1963)], 1,2-dibromo-1-(p-cyanophenyl) - 2-nitro-ethane [A. Vecchi and G. Melone, J. Org. Chem. 22, 1636 (1957)], and 1-chloro-2-nitropropane [U.S. Pat. 3,078,-209]. No reference to the microbicidal activity of the 1,2-dihalo-1-cycloalkyl-2-nitroethanes of the present invention has been found, and their preparation has not been reported previously.

It has been found that 1,2-dihalo-1-cycloalkyl-2-nitroethanes demonstrate microbicidal activity against a number of plant pathogens, in several modes of application. The compounds of the present invention have been found to be especially effective against microorganisms responsible for the damping-off of seedlings.

The compounds found useful as microbicides in the present invention have the formula:

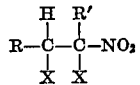

in which R is a monocyclic alkyl radical with 5 or 6 carbon atoms, which may have a lower alkyl substituent; R' is hydrogen or lower alkyl; and X is chlorine or bromine.

In the preferred embodiments of the present invention, R is cyclohexyl and R' is hydrogen.

The preparation of representative compounds and illustrations of their microbicidal properties are set forth in the following examples. All proportions in the examples in the specification are by weight unless otherwise indicated. All temperatures are in degrees centigrade. All reduced pressures not otherwise designated are the pressures normally attainable using a water aspirator.

EXAMPLE I

Preparation of 1-cyclohexyl-1,2-dihalo-2-nitroethanes (A) 1-cyclohexyl-2-nitroethanol.—To a cold (0–10°), continuously stirred mixture of 93.2 g. of cyclohexanecarboxaldehyde and 50.7 g. of nitro-methane in 200 ml. of ethanol was added, dropwise during 3.25 hours, 93.2 ml. of 10 N aqueous sodium hydroxide. After addition was completed, 200 ml. of ice water was added during 45 minutes to reduce the viscosity of the mixture. Stirring was continued for 10 minutes and 93.2 ml. of 10 N aqueous acetic acid was added slowly during 1.5 hours to the mixture while continuing to stir and to maintain the temperature below 10°. When addition was completed, the mixture was allowed to stand until stratification was complete, and the layers were then separated. The aqueous phase was extracted (2× 150 ml.) with diethyl ether. The organic phases were combined and washed successively with water (2× 150 ml.) and saturated aqueous sodium chloride solution (2× 100 ml., then 3× 50 ml.), then dried over magnesium sulfate. The solution was concentrated under reduced pressure to give 125.2 g. of 1-cyclohexyl-2-nitroethanol, the IR (infrared) spectrum of which was consistent with the structure assigned. This product was used in the following step without further purification.

(B) 1-cyclohexyl-2-nitroethyl acetate.—To a mixture of 73.5 g. of 1-cyclohexyl-2-nitroethanol and 3 drops of concentrated sulfuric acid was added, dropwise during 1 hour, 42.8 g. of acetic anhydride, the temperature being kept below 60° throughout the addition by cooling with a cold water bath. After the addition was completed, the mixture was heated at 53–55° for 1 hour, then cooled to room temperature. Three hundred milliliters of diethyl ether was added, and the solution washed successively with water (3× 100 ml.), saturated aqueous sodium bicarbonate solution (3× 75 ml.) and 100 ml. of saturated aqueous sodium chloride solution. The washed solution was dried over calcium chloride and concentrated under reduced pressure to give 71.1 g. of 1-cyclohexyl-2-nitroethyl acetate which was used in the following step without further purification.

Another batch of 1-cyclohexyl-2-nitroethyl acetate, prepared by the same method, was distilled at 109–110° (0.01 mm.); $n_D^{25}$ 1.4681; and analyzed:

*Analysis.*—Calc'd for $C_{10}H_{17}NO_4$ (percent): C, 55.80; H, 7.96; N, 6.51. Found (percent): C, 56.00; H, 8.29; N, 6.66.

(C) 1-cyclohexyl-2-nitroethene.—A mixture of 71.1 g. of 1-cyclohexyl-2-nitroethyl acetate in 132 ml. of benzene and 174.9 g. of sodium carbonate was stirred at the reflux temperature for 4 hours. The mixture was filtered. The filter cake was washed with benzene and then dissolved in a liter of water. The aqueous solution was extracted (2× 100 ml.) with benezne. The benzene solutions were combined and washed successively with 100 ml. of water and 100 ml. of saturated aqueous sodium chloride solution, then dried over sodium sulfate. The dried solution was concentrated under reduced pressure and distilled to give 19.0 g. of 1-cyclohexyl-2-nitroethene; B.P. 107–110° (8 mm.); $n_D^{27}$ 1.4999.

Another product, prepared in the same manner, B.P. 112° (8 mm.); $n_D^{27}$ 1.4976, was analyzed:

*Analysis.*—Calc'd for $C_8H_{13}NO_2$ (percent): C, 61.91; H, 8.44; N, 9.03. Found (percent): C, 62.15; H, 8.18; N, 9.05.

(D) 1,2-dibromo-1-cyclohexyl-2-nitroethane.—A solution of 5.1 g. of bromine in 25 ml. of carbon tetrachloride was added dropwise during 1 hour to a stirred solution of 5.0 g. of 1-cyclohexyl-2-nitroethene in 25 ml. of carbon tetrachloride. The temperature was maintained at 2–4° throughout the addition, and the system was protected from moisture. Stirring and cooling were continued for 0.5 hour after addition was completed. The mixture was concentrated under reduced pressure. The orange residue crystallized on standing to give a solid which was recrystallized from hexane; M.P. 56.5–59.5°. Recrystallization first from petroleum ether (30–60°), then from hexane, gave 3.0 g. of 1,2-dibromo-1-cyclohexyl-2-nitroethane; white needles, M.P. 59–61°.

*Analysis.*—Calc'd for $C_8H_{13}Br_2NO_2$ (percent): C, 30.50; H, 4.16; N, 4.45. Found (percent): C, 30.52; H, 4.42; N, 4.32.

(E) 1,2-dichloro-1-cyclohexyl-2-nitroethane.—Chlorine gas was passed into a stirred solution of 7.8 g. of 1-cyclohexyl-2-nitroethene in 200 ml. of carbon tetrachloride at 4° until excess chlorine was present as indicated by its refluxing from the mixture. The mixture was allowed to warm to room temperature while stirring was continued during 16 hours. The mixture was concentrated. An IR spectrum of the residue showed that reaction was only partially completed. The oil was redissolved in 50 ml. of carbon tetrachloride, the solution was resaturated with chlorine and stirred for 65 hours. Again an IR spectrum of the residue after removal of solvent showed incomplete reaction.

The oil was dissolved in 50 ml. of chloroform and the solution heated under reflux. Chlorine gas was passed into the refluxing solution for 15 minutes and refluxing continued for an additional 30 minutes. The reaction mixture was concentrated to give a pale green oil, the IR spectrum of which showed it to be free of olefin. Distillation gave 2.8 g. of 1,2-dichloro-1-cyclohexyl-2-nitroethane; B.P. 83° (0.04 mm.), $n_D^{24}$ 1.4958.

*Analysis.*—Calc'd for $C_8H_{13}Cl_2NO_2$ (percent): C, 42.50; H, 5.79; N, 6.20. Found (percent): C, 43.15; H, 5.78; N, 6.36.

EXAMPLE II

Inhibition of fungal growth in vitro

Twenty milliliters melted sterile ion agar/potato dextrose broth mixture was cooled to approximately 42° and poured into a sterile petri dish. To the cooling agar was added 0.1 mg. of the microbicide in 0.1 ml. of acetone. When the chemically-treated agar had solidified, it was point-inoculated with a 3 mm. agar block permeated with mycelium. The inoculated agar was incubated at 25° for 3, 6 or 10 days, after which the vegetable growth of the fungus was determined by measurement of the average diameter of the colony. The result with an untreated control in each case was designated 0% inhibition. Results with 1,2-dibromo-1-cyclohexyl-2-nitroethane, the compound of Example I-D, in Table I show that control was especially good in the case of *Rhizoctonia solani* and *Pythium ultimum*, microorganisms responsible for the damping-off of seedlings.

TABLE I

Inhibition of fungal growth in vitro by 1,2-Dihalo-1-cyclohexyl-2-nitroethanes

|  | Percent inhibition | | | |
|---|---|---|---|---|
|  | 1,2-dibromo— | | 1,2-dichloro— | |
| Microorganism tested | 5 p.p.m. | 2.5 p.p.m. | 5 p.p.m. | 2.5 p.p.m. |
| *Alternaria solani* | b 53 | c 3.5 | b 7 | c 25 |
| *Fusarium solani* | b 0 | c 18 | b 0 | c 40 |
| *Sclerotinia fructicola* | b 59 | c 67 | b 23 | c 0 |
| *Helminthosporium oryzae* | a 69 | c 57 | a 30 | c 66 |
| *Piricularia oryzae* | b 33 | c 56 | b 12 | c 35 |
| *Rhizoctonia solani* | a 90 | c 30 | a 35 | c 0 |
| *Pythium ultimum* | a 100 | c 100 | a 100 | c 0 |
| *Verticillium albo-atrum* | b 54 | c 25 | b 6 |  |
| *Fusarium oxysporum* | a 81 | c 58 | a 35 | c 0 | a Growth measured after 3 days.
b Growth measured after 6 days.
c Growth measured after 10 days.

EXAMPLE III

Inhibition of bacterial growth in vitro (A) Seed protection.—Kidney bean (*Phaseolus vulgaris*) seeds were soaked for 0.5 hour in a suspension of *Pseudomonas phaseolicola*. After air-drying, seeds were placed on nutrient agar containing the bactericide. After incubation for 4 days at room temperature, seeds were examined for bacterial infection: Seeds treated with 5 or 10 p.p.m. of 1,2-dibromo-1-cyclohexyl-2-nitroethane or with 5 p.p.m. of streptomycin were not infected; all untreated seeds were infected.

When the same test was run with cucumber (*Cucumis sativus*) seeds inoculated with *Pseudomonas lachrymans*, seeds treated with 10 p.p.m. of 1,2-dibromo-1-cyclohexyl-2-nitroethane were not infected; seeds treated with 5 p.p.m. of streptomycin were partly infected; all untreated seeds were completely rotted.

(B) Bacterial growth test.—A suspension of *Pseudomonas phaseolicola* (*P. phaseolicola*) and liquefied nutrient agar at 42°, containing the compound of Example I-D, 1,2-dibromo-1-cyclohexyl-2-nitroethane, was mixed in a sterile petri dish, incubated at room temperature for 4 days, and the bacterial colonies present were counted. The same test was run using a suspension of *Pseudomonas lachrymans* (*P. lachrymans*). The compound of Example I-D at 10 p.p.m. completely inhibited both organisms, and at 5 p.p.m. it completely inhibited *P. phaseolicola* and greatly inhibited *P. lachrymans*. These results are presented in Table II.

TABLE II

Bacterial growth test in vitro

|  | Number of colonies/plate | |
|---|---|---|
| Treatment | *P. phaseolicola* | *P. lachrymans* |
| Compound of Example I-D: | | |
| 10 p.p.m. | 0 | 0 |
| 5 p.p.m. | 0 | 20 |
| Streptomycin, 5 p.p.m. | 0 | 0 |
| No agent | 20 | >100 |

EXAMPLE IV

Determination of minimum inhibitory concentration

The compound of Example I-D, 1,2-dibromo-1-cyclohexyl-2-nitroethane, was dissolved in dimethyl sulfoxide and the solution was incorporated into an agar medium inoculated with one of the microorganisms specified in Table III. A range from 100 to 0.1 micrograms/ml. was covered by stepwise concentration changes to determine a minimum inhibitory concentration (MIC). The solvent alone was determined to be nontoxic to these organisms.

TABLE III

Minimum inhibitory concentration of microbicide

| Microorganism tested: | MIC of compound of Example I-D (micrograms/ml.) |
|---|---|
| *Aspergillus niger* | 3 |
| *Penicillium notatum* | 3 |
| *Mucor rouxii* | 30 |
| *Fusarium oxysporum* | 10 |
| *Escherichia coli* | 30 |
| *Bacillus subtilis* | 30 |
| *Sarcina lutea* | 30 |
| *Pseudomonas aureofaciens* | 30 |

EXAMPLE V

Soil incorporation tests in vivo

Three lots of soil containing 15 p.p.m., 10 p.p.m., and 5 p.p.m., respectively, of the compound of Example I-D were prepared by blending the requisite quantity of a 5% wettable powder formulation of the active compound with soil (⅔ top soil and ⅓ sand) which had been inoculated with *Rhizoctonia solani* and *Pythium ultimum*. A portion of inoculated soil to which none of the compound of Example I-D had been added was maintained as a check. Six 3-inch pots were filled from each lot of soil and immediately thereafter two pots from each of the four sets were each planted with 25 cucumber (*Cucumis sativus*) seeds. Two pots from each of the four sets were planted 3 days after initial treatment, and the last pair from each set was planted 8 days after initial treatment. All pots, before planting and after planting, were maintained in the greenhouse under normal growing conditions and examined at intervals until healthy seedlings had the first true leaf fully expanded, at which time the healthy plants in each replicate were counted. Results are presented in Table IV.

TABLE IV

Soil incorporation tests in vivo

| Treatment with compound of Example I-D | Healthy seedlings (25 seeds/replicate) | | |
|---|---|---|---|
| | Planted, day 0 | Planted, day 3 | Planted, day 8 |
| 15 p.p.m | 20, 24 | 25, 15 | 24, 21 |
| 10 p.p.m | 24, 20 | 17, 21 | 19, 16 |
| 5 p.p.m | 23, 21 | 16, 3 | 22, 20 |
| None | 0, 1 | 0, 2 | 0, 8 |

EXAMPLE VI

Seed treatment tests in vivo

Plant seeds were treated with a wettable powder formulation of the compound of Example I–D in quantities sufficient to provide 4 ounces, 2 ounces, and 1 ounce of the compound of Example I–D per 100 pounds of seed (4, 2, and 1 grams/1.6 kilograms). Twenty treated seeds of each plant variety were planted in containers of soil (⅔ top soil and ⅓ sand) which had been inoculated with *Rhizoctonia solani*, *Fusarium solani* and *Pythium ultimum*. Growth containers were held in a greenhouse under normal growing conditions for 2 to 3 weeks, after which the healthy plants were counted. Untreated seeds were planted in inoculated soil at the same time for comparison. Results are presented in Table V.

TABLE V

Seed treatment tests in vivo

| Crop | Treatment with compound of Example I-D (oz./cwt.)[1] | Healthy seedlings (percent) |
|---|---|---|
| Cucumber (*cucumis sativus*) | 4 | 95 |
| | 2 | 35 |
| | 1 | 85 |
| | None | 45 |
| Pinto bean (*phaseolus vulgaris*) | 4 | 100 |
| | 2 | 85 |
| | 1 | 90 |
| | None | 100 |
| Kidney bean (*phaseolus vulgaris*) | 4 | 100 |
| | 2 | 95 |
| | 1 | 50 |
| | None | 80 |
| Azuki bean (*phaseolus vulgaris*) | 2 | 95 |
| | None | 75 |
| Soybean (*glycine max.*) | 2 | 85 |
| | None | 40 |
| Peas (*pisum sativus*) | 4 | 100 |
| | 2 | 90 |
| | 1 | 90 |
| | None | 20 |
| Cotton (*gossypium hirsutum*) | 4 | 85 |
| | 2 | 95 |
| | 1 | 95 |
| | None | 25 |
| Wheat (*triticum aestivum*) | 4 | 45 |
| | 2 | 50 |
| | 1 | 30 |
| | None | 25 |

[1] Equivalent to grams/1.6 kilograms.

The results obtained in vivo in Examples V and VI confirm the results of Example II in vitro that the compounds of the present invention are particularly efficacious against microorganisms responsible for damping-off of seedlings, *Rhizoctonia solani* and *Pythium ultimum*. Utility of the compounds of the present invention for seed treatment and for incorporation in soil in which seeds are to be planted is seen to be excellent.

The dihalonitroethanes of this invention form effective microbicidal compositions when formulated with any of the relatively inert adjuvants and carriers normally employed for facilitating the dispersion of active ingredients for microbicidal applications, recognizing the fact that the formulation and mode of application of a toxicant may affect the activity of the material in a given application. If the formulation permits even distribution of the active ingredients and provides contact with the area to be protected or disinfected, the precise nature of the formulation is not critical. Preferred formulations are those in which the pH of the finished formulation is below 7. Thus the dihalonitroethanes of this invention may be formulated as wettable powders, as dusts, as emulsifiable concentrates, as solutions, or as any of several other known types of formulations depending on the desired mode of application. These formulations may contain as little as 0.5% to as much as 95% or more by weight of active ingredient.

Wettable powders are in the form of finely divided particles which disperse readily in water or other dispersant. The wettable powder is ultimately applied either as a dry powder or as a suspension in water or other liquid. Typical carriers for wettable powders include fuller's earth, kaolin clays, silicas or other readily wet organic or inorganic diluents. Wettable powders normally are prepared to contain about 5 to 95% of active ingredient, depending on the absorbency of the carrier, and usually also contain a small amount of a wetting or dispersing agent. For example, a useful wettable powder formulation contains 25.0 parts of the dihalonitroethane, 72.0 parts of Attaclay, and 1.5 parts of sodium lignosulfonate and 1.5 parts of sodium alkylnaphthalenesulfonate as wetting agents.

Dusts are free-flowing admixtures of the active ingredient with finely divided solids such as talc, natural clays, kieselguhr, flours such as walnut shell and cotton seed flours, and other organic and inorganic solids which act as dispersants and carriers for the toxicant; these finely divided solids have an average particle size of less than about 50 microns. A typical dust formulation, useful herein, is one containing 1.0 part of the dihalonitroethane and 99.0 parts of talc.

Emulsifiable concentrates are homogeneous liquid or paste compositions which are dispersible in water or other dispersant, and may consist entirely of the dihalonitroethane with a liquid or solid emulsifying agent, or may also contain a liquid carrier, such as xylene, heavy aromatic naphthas, dimethyl sulfoxide, isophorone, and other nonvolatile organic solvents. For application, these concentrates are dispersed in water or other liquid carrier, and normally applied as a spray to the area to be treated. The percentage by weight of the essential active ingredient may vary according to the manner in which the composition is to be applied, but in general comprises 0.5 to 95% of the microbicidal composition.

Other useful formulations for microbicidal applications include simple solutions of the active ingredient in dispersant in which it is completely soluble at the desired concentration, such as acetone, alkylated naphthalenes, xylene, or other organic solvents.

Typical wetting, dispersing, or emulsifying agents used in agricultural formulations include, for example, the alkyl and alkylaryl sulfonates and sulfates and their sodium salts; polyhydric alcohols; and other types of surface-active agents, many of which are available in commerce. The surface-active agent, when used, normally comprises from 1 to 15% by weight of the composition.

I claim:

1. 1,2-dibromo-1-cyclohexyl-2-nitroethane.

References Cited

UNITED STATES PATENTS 3,103,539   9/1963   Ordas ............... 260—644

LELAND A. SEBASTIAN, Primary Examiner

U.S. Cl. X.R.

424—349